US010133399B2

(12) United States Patent
Hashida

(10) Patent No.: US 10,133,399 B2
(45) Date of Patent: Nov. 20, 2018

(54) TRANSPARENT CONDUCTIVE LAMINATE, TOUCH PANEL AND DISPLAY DEVICE

(71) Applicant: VTS-Touchsensor Co. Ltd., Higashiomi-shi (JP)

(72) Inventor: Yasunori Hashida, Taito-ku (JP)

(73) Assignee: VTS-Touchsensor Co. Ltd., Higashiomi-shi (JP)

( * ) Notice: Subject to any disclaimer, the term of this patent is extended or adjusted under 35 U.S.C. 154(b) by 28 days.

(21) Appl. No.: 15/161,743

(22) Filed: May 23, 2016

(65) Prior Publication Data

US 2016/0266713 A1 Sep. 15, 2016

Related U.S. Application Data

(63) Continuation of application No. PCT/JP2014/079637, filed on Nov. 7, 2014.

(30) Foreign Application Priority Data

Nov. 22, 2013 (JP) ................................ 2013-241822

(51) Int. Cl.
*G06F 3/044* (2006.01)
*G06F 3/041* (2006.01)
(Continued)

(52) U.S. Cl.
CPC ............ *G06F 3/0416* (2013.01); *G06F 3/044* (2013.01); *G06F 3/047* (2013.01); *G02F 1/1345* (2013.01)

(58) Field of Classification Search
CPC ........ G06F 3/044; G06F 3/0416; G06F 3/047; G02F 1/1345; G02F 1/13452
See application file for complete search history.

(56) References Cited

U.S. PATENT DOCUMENTS

2006/0123293 A1* 6/2006 Kim ..................... G09G 3/3291
714/724
2007/0080433 A1 4/2007 Lai
(Continued)

FOREIGN PATENT DOCUMENTS

EP 2 065 873 A1 6/2009
JP 2009-237673 A 10/2009
(Continued)

OTHER PUBLICATIONS

International Search Report dated Jan. 20, 2015 in PCT/JP2014/079637, filed Nov. 7, 2014.
(Continued)

*Primary Examiner* — Xuemei Zheng
(74) *Attorney, Agent, or Firm* — Oblon, McClelland, Maier & Neustadt, L.L.P.

(57) ABSTRACT

A transparent conductive laminate including a first electrode layer including first electrodes connected with first wirings, and a second electrode layer including second electrodes connected with second wirings. One or more first wirings form a reference connection element, and one or more first wirings form a branch connection element adjacent to the reference connection element and has a path branching from that of the reference connection element. The first and/or second electrode layer includes a correction electrode which functions as a correction pattern structure that reduces a time constant difference between the reference connection element and the branch connection element. The correction electrode is positioned in the first and/or second electrode layer at a location which faces the reference connection element with a transparent dielectric layer interposed therebetween. The correction electrode has an electric potential different from that of the first or second wiring that faces the correction electrode.

20 Claims, 6 Drawing Sheets

(51) Int. Cl.
   *G02F 1/1345*   (2006.01)
   *G06F 3/047*    (2006.01)

(56) References Cited

U.S. PATENT DOCUMENTS

| | | |
|---|---|---|
| 2009/0244021 A1 | 10/2009 | Matsuo et al. |
| 2009/0262095 A1 | 10/2009 | Kinoshita et al. |
| 2010/0033666 A1 | 2/2010 | Akiyama et al. |
| 2010/0283752 A1 | 11/2010 | Maeda |
| 2011/0090170 A1 | 4/2011 | Lin et al. |
| 2011/0254805 A1 | 10/2011 | Tanimizu et al. |
| 2013/0277186 A1* | 10/2013 | Sekizawa ........... H03K 17/9618 200/181 |

FOREIGN PATENT DOCUMENTS

| | | |
|---|---|---|
| JP | 2009-258935 A | 11/2009 |
| JP | 2010-257178 A | 11/2010 |
| JP | 2010-262460 A | 11/2010 |
| JP | 2011-221938 A | 11/2011 |
| JP | 2012-230471 A | 11/2012 |
| JP | 2013-225266 A | 10/2013 |

OTHER PUBLICATIONS

Extended European Search Report dated May 23, 2017 in Patent Application No. 14864168.1.

\* cited by examiner

TRANSPARENT CONDUCTIVE LAMINATE, TOUCH PANEL AND DISPLAY DEVICE

CROSS-REFERENCE TO RELATED APPLICATIONS

The present application is a continuation of International Application No. PCT/JP2014/079637, filed Nov. 7, 2014, which is based upon and claims the benefits of priority to Japanese Application No. 2013-241822, filed Nov. 22, 2013. The entire contents of these applications are incorporated herein by reference.

BACKGROUND OF THE INVENTION

Field of the Invention

The technology of the present disclosure relates to transparent conductive laminates used for projected capacitance touch panels, touch panels having a transparent conductive laminate, and display devices having a touch panel.

Discussion of the Background

Projected capacitance touch panels include a plurality of drive electrodes extending in an X direction and a plurality of sensing electrodes extending in a Y direction perpendicular to the X direction, which are disposed with a transparent dielectric layer interposed therebetween. An electrostatic capacitance between the drive electrode and the sensing electrode which face each other decreases when a finger or the like touches an operating surface of the touch panel. Accordingly, whether there is decrease in the electrostatic capacitance between each of the drive electrodes and each of the sensing electrodes that faces the corresponding one of the drive electrodes is detected for each of the sensing electrodes to detect an operating position on the operating surface.

In a plane in which the drive electrodes are located, wirings that extend from a plurality of drive electrodes are disposed in the region outside the drive electrodes and connected to the drive circuit that supplies signals to each of the drive electrodes. Further, in a plane in which the sensing electrodes are located, wirings that extend from a plurality of sensing electrodes are disposed in the region outside the sensing electrodes and connected to the sensing circuit that receives signals from each of the sensing electrodes (for example, see PTL 1).

PTL 1: JP-A-2012-230471

SUMMARY OF THE INVENTION

According to one aspect of the present invention, a transparent conductive laminate includes a first electrode layer which includes first electrodes extending in a first direction and connected with first wirings such that each of the first wirings is connected with a different one of the first electrodes, a second electrode layer which includes second electrodes extending in a second direction perpendicular to the first direction and connected with second wirings such that each of the second wirings is connected with a different one of the second electrodes, and a transparent dielectric layer positioned between the first electrode layer and the second electrode layer. The first wirings include at least one first wiring that forms a reference connection element and at least one first wiring that forms a branch connection element which is adjacent to the reference connection element and has a path branching from a path of the reference connection element. The first wirings are formed such that the at least one first wiring forming the reference connection element is shorter than the at least one first wiring forming the branch connection element. The first electrode layer and/or second electrode layer includes a correction electrode which functions as a correction pattern structure that reduces a time constant difference between the reference connection element and the branch connection element forming a wiring pair with the reference connection element. The correction electrode is positioned in the first electrode layer and/or the second electrode layer at a location which faces the reference connection element with the transparent dielectric layer interposed therebetween. The correction electrode has an electric potential different from an electric potential of at least one first or second wiring that faces the correction electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
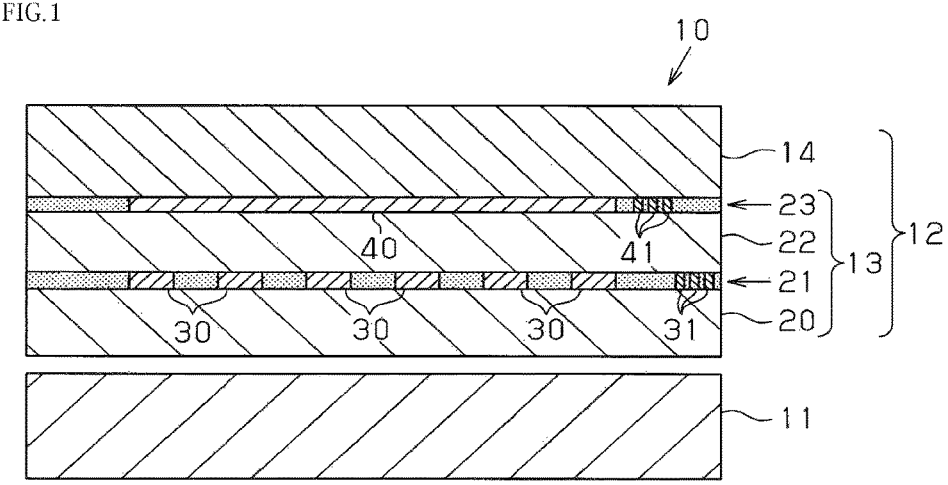
FIG. 1 is a cross sectional view which shows a cross sectional configuration of a transparent conductive laminate, a touch panel and a display device according to the first to third embodiments that implement the technique of the present invention.

The embodiments will now be described with reference to the accompanying drawings, wherein like reference numerals designate corresponding or identical elements throughout the various drawings.

First Embodiment

With reference to FIGS. 1 to 7, the first embodiment of a transparent conductive laminate, a touch panel and a display device will be described. First, referring to FIG. 1, an overall configuration of a display device will be described. In FIG. 1, a reduced number of the electrodes and the wirings of the transparent conductive laminate are shown for clarity.

As shown in FIG. 1, a display device 10 includes a display panel 11 and a touch panel 12 laminated on the display panel 11 via an adhesive member.

The touch panel 12 includes a transparent conductive laminate 13 made up of substrates and a plurality of electrodes formed on the substrates and a cover layer 14 laminated on the transparent conductive laminate 13 to form an operating surface which is a surface of the touch panel 12.

The transparent conductive laminate 13 includes a drive substrate 20, a drive electrode layer 21 formed on the drive substrate 20, a sensing substrate 22 and a sensing electrode layer 23 formed on the sensing substrate 22. The drive substrate 20 and the sensing substrate 22 are formed of, for example, a glass or a resin film.

The drive electrode layer 21 includes a plurality of drive electrodes 30 and a plurality of drive wirings 31 each connected to the corresponding one of the drive electrodes 30, and the sensing electrode layer 23 includes a plurality of sensing electrodes 40 and a plurality of sensing wirings 41 each connected to the corresponding one of the sensing electrodes 40.

The drive electrode 30 is formed, for example, by etching a metal film formed of a copper film, silver film or the like formed on the surface of the drive substrate 20, and the sensing electrode 40 is formed, for example, by etching a metal film formed of a copper film, silver film or the like formed on the surface of the sensing substrate 22. Alternatively, the drive electrode 30 and the sensing electrode 40 may be formed, for example, by etching a metal oxide such as indium tin oxide (ITO).

The drive wiring 31 may be formed together with the drive electrode 30 by etching a metal film that is the same as the drive electrode 30 or by etching a metal film different from the drive electrode 30. The sensing wiring 41 may be formed together with the sensing electrode 40 by etching a metal film that is the same as the sensing electrode 40 or by etching a metal film different from the sensing electrode 40.

In the transparent conductive laminate 13, the sensing substrate 22 on which the sensing electrode layer 23 is formed is laminated on the drive substrate 20 on which the drive electrode layer 21 is formed via the adhesive member. Further, instead of the above configuration, the transparent conductive laminate 13 may have a configuration in which the drive electrode layer 21 is formed on one surface of the substrate and the sensing electrode layer 23 is formed on the other surface of the substrate. Alternatively, in addition to the above configuration layer, the transparent conductive laminate 13 may include a functional layer such as a layer for enhancing mechanical strength of the laminate or a layer for adjusting optical properties of the laminate.

The cover layer 14 is made of, for example, a tempered glass or a synthetic resin and bonded on the transparent conductive laminate 13 via an adhesive member. Further, a circuit or the like is connected to the drive electrode 30 and the sensing electrode 40 so as to input and output signals to and from the drive electrode 30 and the sensing electrode 40.

The display panel 11 is, for example, a liquid crystal panel or an organic EL panel. The display device 10 is formed by laminating the display panel 11 and the touch panel 12 and assembling a variety of sensors and cameras, a circuit and the like.

Figure 2:
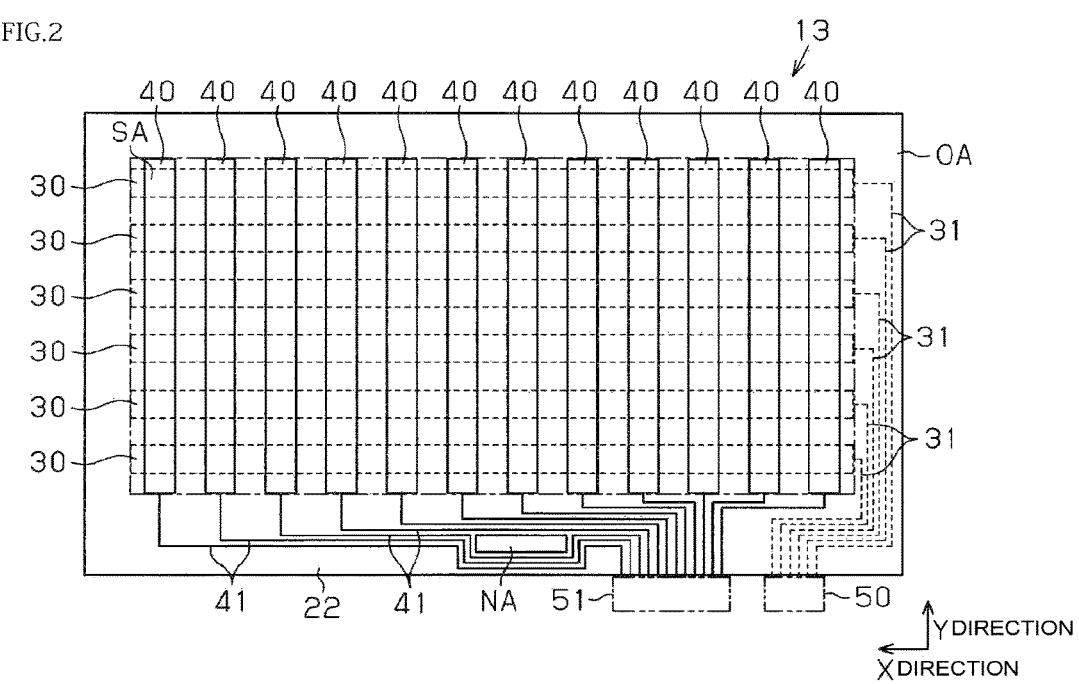
FIG. 2 is a plan view which shows a plan configuration of the transparent conductive laminate of FIG. 1.

Referring to FIG. 2, an arrangement of the electrodes 30 and 40 and the wirings 31 and 41 in the transparent conductive laminate 13 will be described. In FIG. 2, a reduced number of the electrodes 30 and 40 and the wirings 31 and 41 are shown for clarity.

As shown in FIG. 2, a plurality of drive electrodes 30 each extending in the X direction are arranged side by side with a gap therebetween in the Y direction which is perpendicular to the X direction in plan view of the transparent conductive laminate 13. Further, a plurality of sensing electrodes 40 each extending in the Y direction are arranged side by side with a gap therebetween in the X direction. When the electrodes 30 and 40 are formed of a metal film, each of the electrodes 30 and 40 is formed, for example, of a plurality of etched metal wires. Alternatively, when the electrodes 30 and 40 are formed of ITO, each of the electrodes 30 and 40 is formed, for example, in a rectangular shape or a shape of a sequence of a plurality of diamonds which are arranged in one direction.

Regions in which a plurality of drive electrodes 30 and a plurality of sensing electrodes 40 face to each other are detection regions SA that allow for detection of an operating position on the operating surface. That is, the regions in which a plurality of drive electrodes 30 are formed on the drive substrate 20 and a plurality of sensing electrodes 40 are formed on the sensing substrate 22 correspond to the detection regions SA.

A plurality of drive electrodes 30 are each connected to the drive wirings 31 on the drive substrate 20. The drive wirings 31 are led out from one end of the drive electrodes 30 and extend on a peripheral region OA which is a region outside the detection regions SA. Similarly, a plurality of sensing electrodes 40 are each connected to the sensing wirings 41 on the sensing substrate 22. The sensing wirings 41 are led out from one end of the sensing electrodes 40 and extend on the peripheral region OA which is a region outside the detection regions SA. Preferably, the drive wirings 31 and the sensing wirings 41 do not overlap each other in plan view of the transparent conductive laminate 13 in order to prevent generation of capacitance between the drive wirings 31 and the sensing wirings 41.

In assembly of the touch panel 12 using the transparent conductive laminate 13, the drive wirings 31 are connected to the drive circuit 50, and the sensing wirings 41 are connected to the sensing circuit 51. The drive circuit 50 applies a selection signal to each of the drive electrodes 30 in sequence via the drive wirings 31 so as to charge or discharge the sensing substrate 22. Then, the sensing electrodes 40 output a detection signal corresponding to the amount of capacitance between the drive electrodes 30 and the sensing electrodes 40 to the sensing circuit 51 via the sensing wirings 41. On the basis of the detection signal outputted, increase or decrease of the capacitance between each of the drive electrodes 30 and each of the sensing electrodes 40 is determined to detect the operating position on the operating surface.

The drive substrate 20 and the sensing substrate 22 are an example of a substrate having a rectangular shape. In the peripheral region of the substrate, that is, the peripheral region OA, a non-wiring region NA is disposed in one side region of the substrate which is a portion along one side of the substrate. The non-wiring region NA includes, for example, a region for mounting various sensors, cameras, speakers, microphones and the like when assembly of the touch panel 12 or the display device 10 is completed, a region for inserting screws to fix the components of the touch panel 12 or the display device 10, and a region for marking a serial number. In the transparent conductive laminate 13, the non-wiring region NA is implemented, for example, as a hole for placing the above components.

Figure 3:
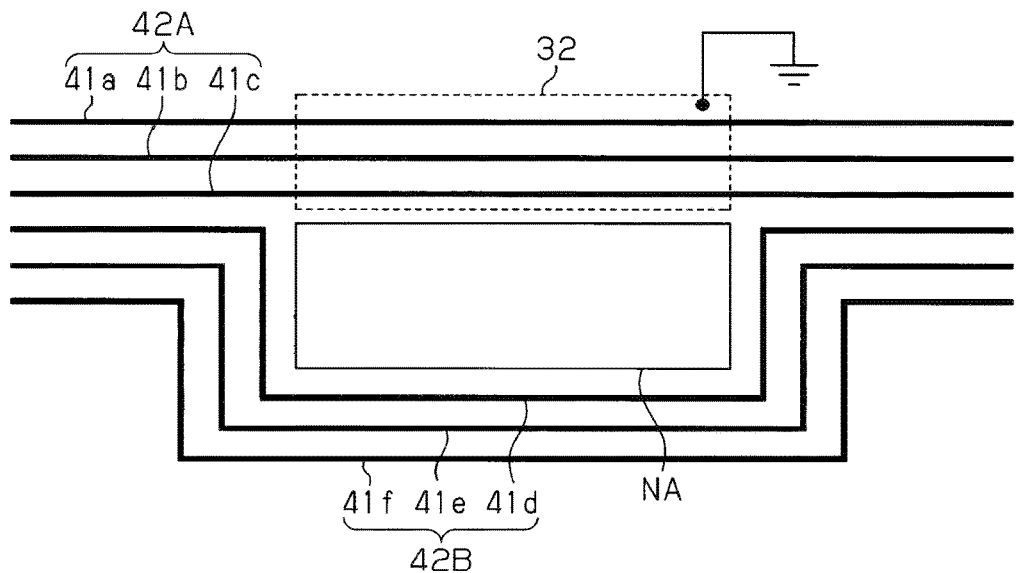
FIG. 3 is an enlarged plan view which shows a vicinity of a non-wiring region in the transparent conductive laminate of the first embodiment.
Figure 4:
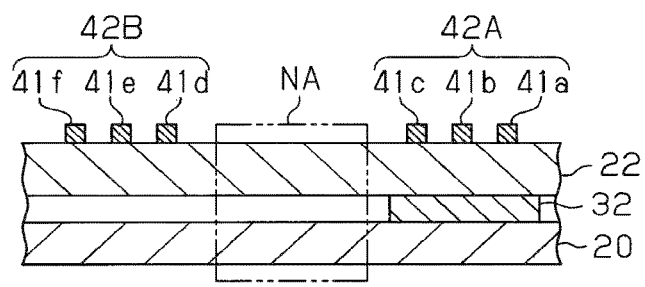
FIG. 4 is an enlarged cross sectional view which shows a vicinity of the non-wiring region in the transparent conductive laminate of FIG. 3.

Referring to FIGS. 3 and 4, details of the arrangement of the wirings in the peripheral region OA will be described by means of an example in which the non-wiring region NA is disposed on the peripheral region OA on the sensing substrate 22.

As shown in FIG. 3, in the vicinity of the non-wiring region NA, a plurality of sensing wirings 41 branches into reference connection element 42A which is not disturbed by the non-wiring region NA and extends in a straight line adjacent to the non-wiring region NA, and branch connection element 42B which bypasses the non-wiring region NA. The paths of the reference connection element 42A and the branch connection element 42B branch before they reach the non-wiring region NA and merge after they pass by the non-wiring region NA.

Since the branch connection element 42B extends around the non-wiring region NA to bypass the non-wiring region NA, the lengths of the sensing wirings 41 in the branch connection element 42B are longer than the lengths of the sensing wirings 41 in the reference connection element 42A. The more the sensing electrodes 40 are located away from the sensing circuit 51, the longer the lengths of the sensing wirings 41 connected to the sensing electrodes 40. Accordingly, there is a gradual variation in the length between the sensing wirings 41, which causes a time constant difference. However, this time constant difference can be corrected in the sensing circuit 51.

On the other hand, the variation in the wiring length between the sensing wiring 41 in the reference connection element 42A which is located closest to the branch connection element 42B and the sensing wiring 41 in the branch connection element 42B which is located closest to the reference connection element 42A is a variation between the connection elements, which is a local variation in a plurality of sensing wirings 41.

More specifically, the wirings 41a, 41b, 41c are arranged in this order in the reference connection element 42A, and the wirings 41d, 41e, 41f are arranged in this order in the branch connection element 42B with the wiring 41c and the wiring 41d adjacent to each other. Here, the difference in length between the adjacent sensing wirings 41 becomes drastically large between the wiring 41c and the wiring 41d, which are located at the boundary between the reference connection element 42A and the branch connection element 42B. The sensing wirings 41 that contribute to the local variation need to be independently processed by the sensing circuit 51 so that the sensing circuit 51 corrects the variation of the time constant difference due to the variation in the local wiring length. This imposes a heavy load on the design of the sensing circuit 51.

In the first embodiment, a correction electrode 32, which is an example of a correction pattern, is disposed on the drive substrate 20 in part of a region that overlaps the reference connection element 42A in plan view of the transparent conductive laminate 13. The correction electrode 32 is disposed in one side region of the peripheral region OA in which the non-wiring region NA is disposed.

As shown in FIG. 4, the correction electrode 32 is disposed on the drive substrate 20 in a region that faces the reference connection element 42A so as to overlap a plurality of wirings 41a to 41c that constitute the reference connection element 42A in plan view of the transparent conductive laminate 13. The correction electrode 32 is not disposed in the region that faces the branch connection element 42B. The correction electrode 32 has an electric potential, for example, a ground potential, which is different from that of the sensing wirings 41 that face the correction electrodes 32. The correction electrode 32 may have any potential that allows capacitance to be generated between the correction electrode 32 and the sensing wiring 41.

Figure 5:
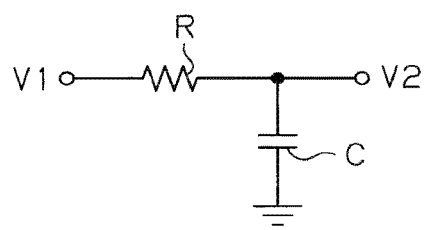
FIG. 5 is a circuit diagram which shows an equivalent circuit of the wiring of the first embodiment.

With reference to FIG. 5, an effect of the above configuration will be described.

As shown in FIG. 5, the straight drive wirings 31 and the sensing wirings 41 are transmission lines with little inductance, and their equivalent circuit is expressed as an RC circuit having a resistance R that connects a potential V1 and a potential V2 which is different from the potential V1, and a capacitor C that connects a ground potential to a mid-point between the resistance R and the potential V2. In the RC circuit, a time constant $\tau$ is calculated as a product of a resistance value r of the resistance R and a capacitance value c of the capacitor C as expressed by an equation (1).

$$\tau(s) = r(\Omega) \times c(F) \tag{1}$$

Due to a difference in length of the sensing wirings 41, the resistance values ra of the sensing wirings 41 in the reference connection element 42A are generally smaller than the resistance values rb of the sensing wirings 41 in the branch connection element 42B. More specifically, for the wirings 41a to 41f, assume that the adjacent sensing wirings 41 are a wiring pair. The difference in resistance value between the sensing wirings 41 of each wiring pair becomes drastically large in the wiring pair extending over the reference connection element 42A and the branch connection element 42B.

If no correction electrode 32 is provided, a difference in time constant $\tau$ between the adjacent sensing wirings 41 due to the variation in resistance value becomes drastically large between the wiring 41c and the wiring 41d. Such a local variation in the difference in time constant $\tau$ between the adjacent sensing wirings 41 causes a difference in output due to the difference in time constant $\tau$ to be judged as noise in calculation of an operating position. This reduces the detection accuracy of the operating position.

In this embodiment, however, the correction electrode 32 is provided so as to increase a capacitance value ca of the sensing wirings 41 in the reference connection element 42A. Since the increase amount of the capacitance value ca can be adjusted depending on the size of the region in which the correction electrode 32 is provided, the increase amount of the capacitance value ca can be adjusted depending on the difference between the resistance value ra and the resistance value rb. As a result, the difference in time constant $\tau$ between the wiring pair extending over the reference connection element 42A and the branch connection element 42B, that is, between the wiring 41c and the wiring 41d decreases. Accordingly, compared to the case where no correction electrode 32 is provided, variation in the time constant difference due to branching is not likely to occur between the reference connection element 42A and the branch connection element 42B, thereby preventing the detection accuracy of the operating position from decreasing.

As described above, according to the first embodiment, the detection accuracy of the contact position is prevented from decreasing regardless of the sensing wirings 41 branching into different paths around the non-wiring region NA, that is, into the reference connection element 42A and the branch connection element 42B. Based on the conventional art, the wirings need to be arranged into a bundle in order to prevent an abrupt change in time constant $\tau$ of the wirings. In that case, the non-wiring region NA has to be positioned in a region that does not affect the wiring path. This decreases a degree of freedom in positioning of the non-wiring region NA. On the other hand, according to the first embodiment, a high degree of freedom in positioning of the non-wiring region NA can be ensured since the detection accuracy of the contact position is prevented from decreasing regardless of branching of the wiring paths.

Further, according to the first embodiment, the correction electrode 32 and the non-wiring region NA are positioned in the same one side region. If the non-wiring region NA and the correction electrode 32 are positioned in different end regions, components other than the non-wiring region NA are disposed between the non-wiring region NA and the correction electrode 32. This increases the possibility of a factor arising that causes variation in time constant difference, in addition to the non-wiring region NA, thereby causing difficulty in designing the correction electrode 32. In view of this point, since the non-wiring region NA and the correction electrode 32 are closely positioned in the configuration of the first embodiment, the correction electrode 32 can be easily designed.

Further, according to the first embodiment, the correction electrode 32 overlaps a plurality of wirings 41a to 41c that constitute the reference connection element 42A in plan view of the transparent conductive laminate 13, thereby decreasing a time constant difference between the wiring 41d in the branch connection element 42B and each of the wirings 41a to 41c. As a result, a local variation in the time constant difference is prevented from occurring across the entire plurality of sensing wirings 41.

Figure 6:
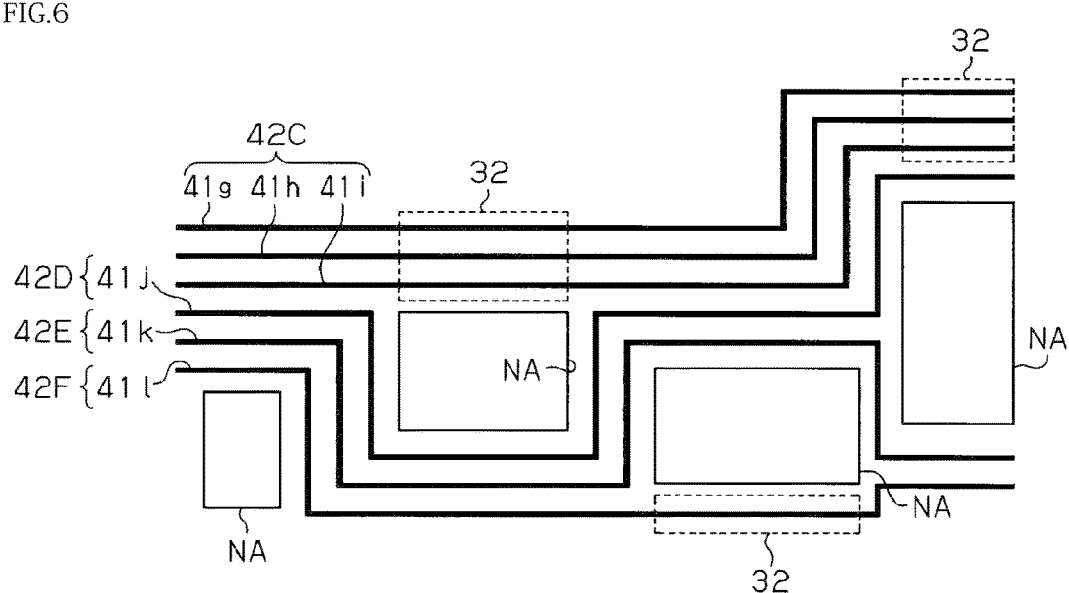
FIG. 6 is a view of an arrangement example of the non-wiring region and the wiring in the transparent conductive laminate of the first embodiment.

For example, FIG. 6 shows an example in which a plurality of non-wiring regions NA are positioned in the peripheral region OA on the sensing substrate 22.

In the example shown in FIG. 6, the sensing wirings 41 are made up of a connection element 42C which includes wirings 41g, 41h, 41i, a connection element 42D which includes a wiring 41j, a connection element 42E which includes a wiring 41k, and a connection element 42F which includes a wiring 41l. The connection elements 42C to 42F each include one or more sensing wirings 41, and the paths of the adjacent connection elements 42 include at least one branch point. The paths of the connection elements 42C to 42F branch and merge around the non-wiring region NA so as to surround the non-wiring region NA.

When one of the adjacent connection elements 42 is provided as a reference connection element, the other of the adjacent connection elements 42 is a branch connection element. In a configuration in which the path of the branch connection element is branched from the path of the reference connection element at one or more points, the shape of the reference connection element and the path of the branch connection element are not limited. The adjacent connection elements 42 are not necessarily merged together after they branch at the branch point, if the sensing wirings 41 of the connection elements 42C to 42F are configured to be each connected to the sensing circuits 51.

Each correction electrode 32 faces the sensing wiring 41 which is relatively smaller in wiring length around the non-wiring region NA. With this arrangement of a plurality of correction electrodes 32, the detection accuracy of the contact position can be prevented from decreasing when the paths of a plurality of connection elements 42C to 42F branch to extend around a plurality of non-wiring regions NA. Since a plurality of non-wiring regions NA are independently positioned in the peripheral region OA, a degree of freedom in positioning of the non-wiring regions NA can be increased.

Further, since the limitation in positioning of the sensing wirings 41 and the non-wiring regions NA decreases, it is possible to position the sensing wirings 41 and the non-wiring regions NA in a small region, thereby decreasing the size of the peripheral region OA. As a result, the region outside the operating position detection region on the operating surface is reduced in size, thereby downsizing the display device 10. Further, a degree of freedom for an outer shape of the peripheral region OA, connection positions of the drive wirings 31 to the drive circuit 50, and connection positions of the sensing wirings 41 to the sensing circuit 51 can be increased. Accordingly, since the outer shape of the transparent conductive laminate 13 in plan view can be formed, for example, in a shape other than a rectangle, a degree of freedom in designing the display device 10 can be increased.

In addition, the capacitance added by the correction electrode 32 to the wirings 41a to 41c of the reference connection element 42A may only have to be such an amount that the adjacent sensing wirings 41 of a plurality of sensing wirings 41 have a small time constant difference compared with the configuration that does not include the correction electrode 32. That is, the capacitance added by the correction electrode 32 may only have to be an amount that decreases a time constant difference caused by the branch of path, and the size of the correction electrode 32 is determined depending on the capacitance added to the wirings 41a to 41c.

Figure 7:
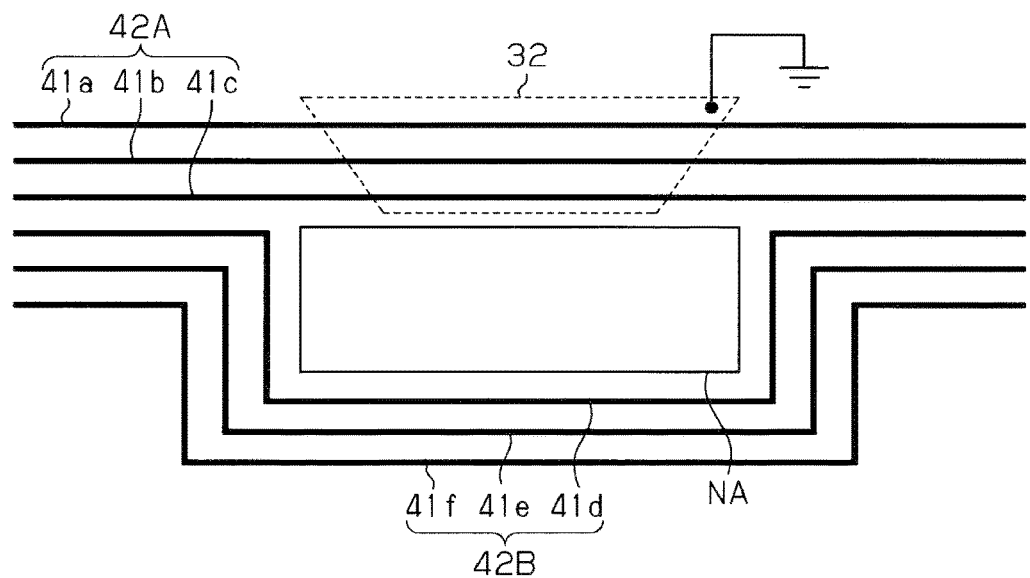
FIG. 7 is an enlarged plan view which shows a vicinity of the non-wiring region in the transparent conductive laminate of a modified example of the first embodiment.

For example, as shown in FIG. 7, the regions in which the correction electrode 32 faces to each of the wirings 41a to 41c of the reference connection element 42A may be different for each of the wirings 41a to 41c. In the example shown in FIG. 7, the length of the correction electrode 32 in the extending direction of the sensing wirings 41 gradually varies in a direction perpendicular to the extending direction of the sensing wirings 41. Accordingly, the size of the region that the correction electrode 32 faces to the wiring 41a, the wiring 41b and the wiring 41c decreases in this order. Accordingly, the capacitance formed between each of the wirings 41a to 41c and the correction electrode 32 are different for each of the wirings 41a to 41c.

With this configuration, when resistance values of the wirings 41a to 41c are different due to the difference in length of the wirings 41a to 41c, different amount of capacitance can be added depending on the difference is resistance value of the wirings 41a to 41c.

Further, in adjustment of the amount of capacitance added to the wirings 41a to 41c of the reference connection element 42A, the correction electrode 32 may be provided as necessary in the region that faces the wirings 41d to 41f of the branch connection element 42B.

In the above embodiment, the sensing electrode layer 23 is an example of the first electrode layer, the sensing electrode 40 is an example of the first electrode, and the sensing wiring 41 is an example of the first wiring. Further, the drive electrode layer 21 is an example of the second electrode layer, the drive electrode 30 is an example of the second electrode, and the drive wiring 31 is an example of the second wiring. The sensing substrate 22 is an example of the transparent dielectric layer.

In the embodiment described above, the non-wiring region NA is disposed in the peripheral region OA on the sensing substrate 22. However, the same configuration can be applied to the configuration in which the non-wiring region NA is disposed in the peripheral region OA on the drive substrate 20. That is, the drive wirings 31 are branched into different paths of the reference connection element and the branch connection element, and the correction electrode is provided on the sensing substrate 22 in the region which faces the drive wiring 31 having a relatively smaller resistance value in a plurality of drive wirings 31 in the reference connection element and the branch connection element. In this case, the drive electrode layer 21 is an example of the first electrode layer, the drive electrode 30 is an example of the first electrode, and the drive wiring 31 is an example of the first wiring. Further, the sensing electrode layer 23 is an example of the second electrode layer, the sensing electrode 40 is an example of the second electrode, and the sensing wiring 41 is an example of the second wiring.

Further, when the non-wiring regions NA are disposed on both the peripheral region OA on the sensing substrate 22 and the peripheral region OA on the drive substrate 20, the above configurations can be combined. In this case, in addition to the first wirings, the second wirings also branch into the different paths of the reference connection element and the branch connection element, and correction of the time constant difference by a correction pattern can be performed for both the first wirings and the second wirings.

Moreover, when the path of the branch connection element is configured to branch from the path of the reference connection element, the non-wiring region NA may not be necessarily disposed.

As described above, according to the first embodiment, the following effect can be obtained.

(1) Regardless of branching of the adjacent paths of the connection elements, variation in the time constant difference in the wiring pair extending over the adjacent connection elements is prevented, thereby preventing the detection accuracy of the operating position from decreasing.

(2) Regardless of branching of the adjacent paths of the connection elements, detection accuracy of an operating position can be prevented from decreasing. Accordingly, the non-wiring regions NA can be independently positioned. Therefore, a degree of freedom in positioning the non-wiring regions NA is increased.

(3) Since the limitation in positioning the wirings and the non-wiring regions NA decreases, it is possible to reduce the size of the peripheral region OA in which the wirings are disposed and increase a degree of freedom for the outer shape of the peripheral region OA.

(4) The time constants of the wirings are corrected by generating a capacitance between the correction electrode and the wirings. That is, the capacitance generated between the correction electrode 32 and the wirings contributes to decreasing the time constant difference of the wirings between the connection elements 42. Accordingly, the time constant is appropriately corrected.

Second Embodiment

Figure 8:
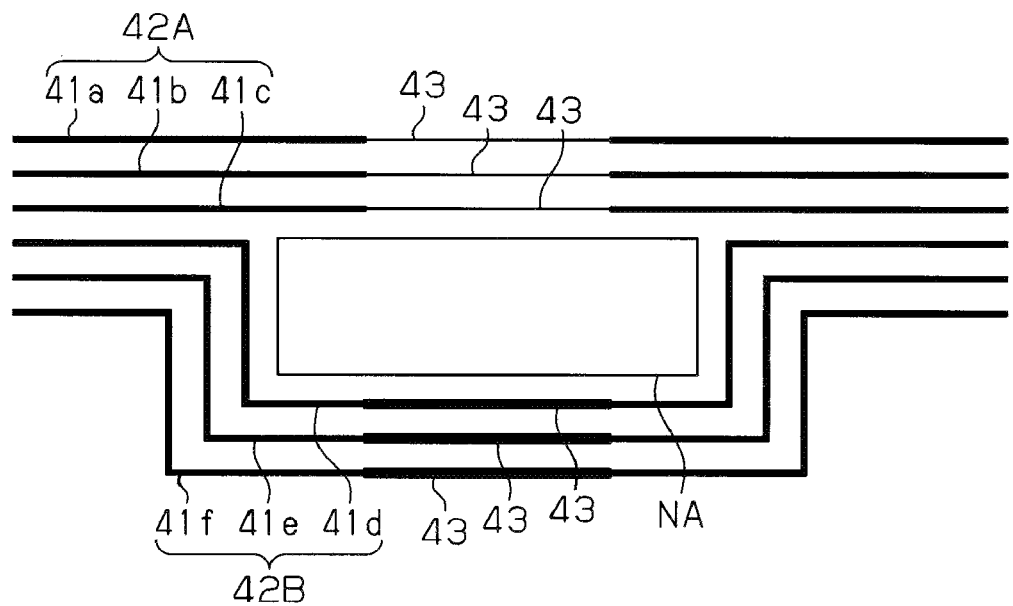
FIG. 8 is an enlarged plan view which shows a vicinity of the non-wiring region in the transparent conductive laminate of the second embodiment.

With reference to FIG. 8, the second embodiment of the transparent conductive laminate, the touch panel and the display device will be described. The second embodiment mainly differs from the first embodiment in the configuration for correcting a time constant difference. The second embodiment will be described focusing on the difference from the first embodiment, and the same components as those of the first embodiment are referred to by the same reference numbers and the description thereof will be omitted.

Further, an example in which the non-wiring region NA is disposed in the peripheral region OA on the sensing substrate 22 will be described.

As shown in FIG. 8, the sensing wirings 41 each include a different wiring width section 43 as an example of the correction pattern, and the different wiring width section 43 is a portion of the sensing wiring 41 having a wiring width different from the remaining portion. The wiring width of the wirings 41a, 41b, 41c of the reference connection element 42A decreases in the different wiring width sections 43. On the other hand, the wiring width of the wirings 41d, 41e, 41f of the branch connection element 42B increases in the different wiring width sections 43. The different wiring width sections 43 of the wirings 41a to 41f have the same length in the extending direction of the sensing wirings 41.

The effect of the above configuration will be described.

As described in the first embodiment, if all the wirings 41a to 41f have a uniform wiring width, the resistance values ra of the sensing wirings 41 in the reference connection element 42A are generally smaller than the resistance values rb of the sensing wirings 41 in the branch connection element 42B. More specifically, the difference in resistance value between the adjacent sensing wirings 41 of the wirings 41a to 41f becomes drastically large in the wiring pair extending over the reference connection element 42A and the branch connection element 42B.

In the second embodiment, however, the wiring widths of the wirings 41a to 41c in the reference connection element 42A are partially narrowed. Accordingly, the resistance values of the wirings 41a to 41c are high compared with the configuration having a uniform wiring width. On the other hand, the wiring widths of the wirings 41d to 41f in the branch connection element 42B are partially widened. Accordingly, the resistance values of the wiring 41d to 41f are low compared with the configuration having uniform wiring widths. The resistance values of the wirings 41a to 41c and the resistance values of the wirings 41d to 41f can be adjusted depending on the length of the different wiring width sections 43.

Accordingly, the difference in time constant τ between the wiring pair extending over the reference connection element 42A and the branch connection element 42B, that is, between the wiring 41c and the wiring 41d becomes small compared with the configuration that does not include the different wiring width section 43. Therefore, variation in the time constant difference due to branching is not likely to occur between the reference connection element 42A and the branch connection element 42B, thereby preventing the detection accuracy of the operating position from decreasing.

The increase and decrease amount of the resistance values of the wirings 41a to 41f by the different wiring width section 43 may be such an amount that the adjacent sensing wirings 41 of a plurality of sensing wirings 41 have a small time constant difference compared with the configuration that does not include the different wiring width section 43. That is, the increase and decrease amount of the resistance value by the different wiring width section 43 may be an amount that decreases a time constant difference caused by the branch of path, and the size of the region for the different wiring width section 43 is determined depending on the increase and decrease amount of the resistance values of the wirings 41a to 41f.

Figure 9:
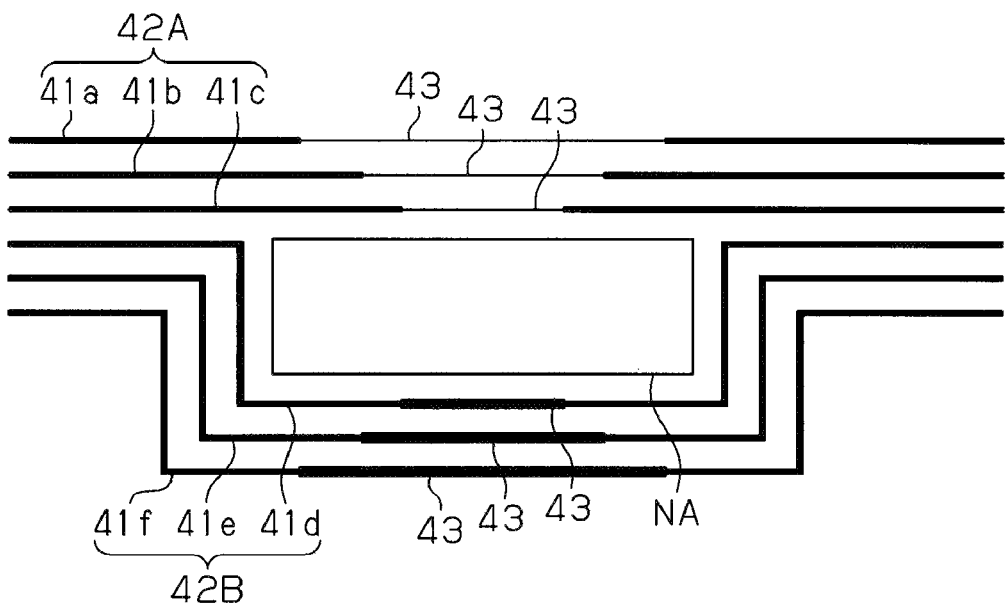
FIG. 9 is an enlarged plan view which shows a vicinity of the non-wiring region in the transparent conductive laminate of a modified example of the second embodiment.

For example, as shown in FIG. 9, the different wiring width sections 43 may be different in size for each of the wirings 41a to 41c, and the different wiring width sections 43 may be different in size for each of the wirings 41d to 41f. In the example shown in FIG. 9, the sizes of the different wiring width sections 43 in the extending direction of the wirings gradually decrease in the order of the wiring 41a, the wiring 41*b* and the wiring 41*c*. Further, the sizes of the different wiring width sections 43 in the extending direction of the wirings gradually increase in the order of the wiring 41*d*, the wiring 41*e* and the wiring 41*f*. Accordingly, the increase amount of the resistance values of the wirings 41*a* to 41*c* is different for each of the wirings 41*a* to 41*c*, and the decrease amount of the resistance values of the wirings 41*d* to 41*f* is different for each of the wirings 41*d* to 41*f*.

In this configuration, when the resistance values of the wirings 41*a* to 41*c* are different from each other and the different wiring width section 43 is not provided, the resistance value can be increased depending on the difference in the resistance value. Alternatively, when the resistance values of the wirings 41*d* to 41*f* are different from each other and the different wiring width section 43 is not provided, the resistance value can be decreased depending on the difference in the resistance value.

Further, depending on the resistance values required for correction of the time constant difference, the different wiring width section 43 may be provided only in the wirings 41*a* to 41*c* of the reference connection element 42A, or the different wiring width section 43 may be provided only in the wirings 41*d* to 41*f* of the branch connection element 42B.

The configuration of the different wiring width section 43 is not limited as far as it allows the wiring widths of the wirings 41*a* to 41*f* to be substantially modified. For example, in the wirings 41*d* to 41*f*, the wiring may branch into two lines in the different wiring width section 43 to increase the substantial wiring width.

In the embodiment described above, the non-wiring region NA is disposed in the peripheral region OA on the sensing substrate 22. However, when the non-wiring region NA is disposed in the peripheral region OA on the drive substrate 20, a different wiring width section having a wiring width different from the remaining portions may be provided on the drive wiring 31. Further, when the non-wiring regions NA are disposed on both the peripheral region OA on the sensing substrate 22 and the peripheral region OA on the drive substrate 20, the above configurations can be combined. Moreover, when the path of the branch connection element is configured to branch from the path of the reference connection element, it may be structured not to have the non-wiring region NA.

As described above, according to the second embodiment, the following effect can be obtained in addition to the effect (1) to (3) of the first embodiment.

(5) Since the different wiring width section 43 is provided in the wiring so as to adjust the resistance values of the wirings, the time constant difference of the wiring is appropriately corrected. That is, the resistance values at the different wiring width sections 43 can reduce the time constant difference due to the branch. In addition, compared with the first embodiment, the capacitance in the detection region SA is prevented from varying by the capacitance at the peripheral region OA. Further, since calculation and measurement of the resistance value of the wiring are easier than for the capacitance, the time constant difference can be easily corrected.

Third Embodiment

Figure 10:
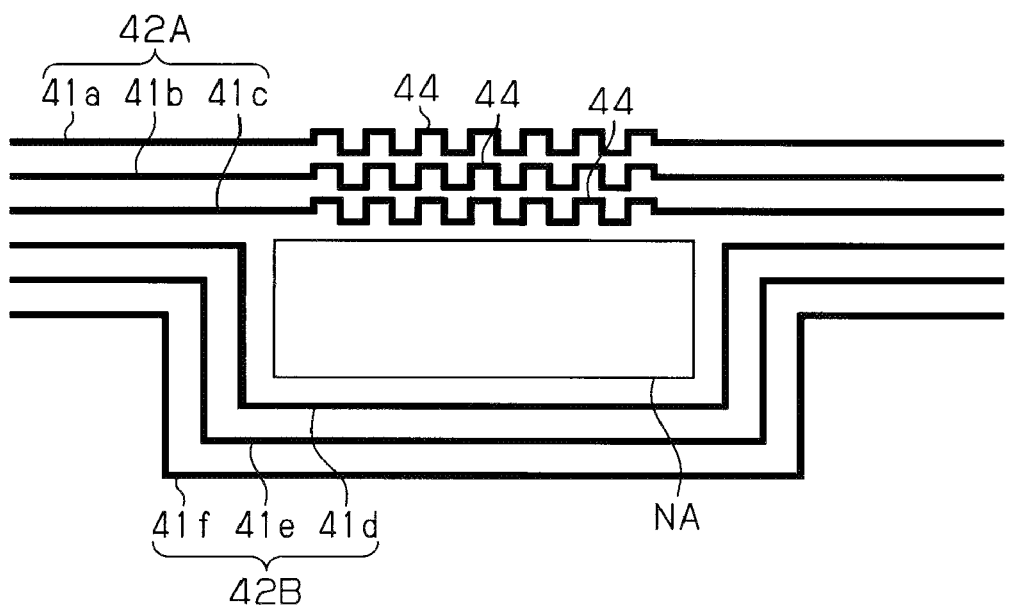
FIG. 10 is an enlarged plan view which shows a vicinity of the non-wiring region in the transparent conductive laminate of the third embodiment.

With reference to FIG. 10, the third embodiment of the transparent conductive laminate, the touch panel and the display device will be described. The third embodiment mainly differs from the first embodiment in the configuration for correcting a time constant difference. The third embodiment will be described focusing on the difference from the first embodiment, and the same components as those of the first embodiment are referred to by the same reference numbers and the description thereof will be omitted.

The following description sets forth an example in which the non-wiring region NA is disposed in the peripheral region OA on the sensing substrate 22.

As shown in FIG. 10, the wirings 41*a*, 41*b*, 41*c* of the reference connection element 42A include different shape sections 44 as an example of a correction pattern. The different shape section 44 has a square zigzag pattern (or square wave shape) made up of a plurality of bending portions of the wirings 41*a* to 41*c* which are bent in a direction perpendicular to an extending direction of the wirings 41*a* to 41*c*. In the bending portions of the wirings 41*a* to 41*c*, the extending direction of the wirings 41*a* to 41*c* changes by 90 degrees. In a unit length of the different shape section 44 in the extending direction of the wirings 41*a* to 41*c*, a path length of the different shape section 44 is longer than a path length of a portion other than the different shape section 44 in the sensing wiring 41 having the different shape section 44. The "path length" refers to a tracing length of the wiring. Accordingly, the wirings 41*a* to 41*c* have an actually increased length compared to straightly extending wirings 41*a* to 41*c*. That is, the length of the wirings 41*a* to 41*c* having the different shape section 44 is longer than the entire path length of the reference connection element 42A having the wirings 41*a* to 41*c*.

The effect of the above configuration will be described.

As described in the first embodiment, if no different shape section 44 is provided, the resistance values ra of the sensing wirings 41 in the reference connection element 42A are generally smaller than the resistance values rb of the sensing wirings 41 in the branch connection element 42B. More specifically, the difference in resistance value between the adjacent sensing wirings 41 of the wirings 41*a* to 41*f* becomes drastically large in the wiring pair extending over the reference connection element 42A and the branch connection element 42B.

In the third embodiment, however, the different shape section 44 increases the actual length of the wirings 41*a* to 41*c* of the reference connection element 42A, thereby increasing the resistance value of the wirings 41*a* to 41*c*. The increase amount of the resistance values of the wirings 41*a* to 41*c* can be adjusted depending on the path length added by the different shape section 44.

Accordingly, the difference in time constant $\tau$ between the wiring pair extending over the reference connection element 42A and the branch connection element 42B, that is, between the wiring 41*c* and the wiring 41*d* becomes small compared with the configuration that does not include the different shape section 44. Therefore, variation in the time constant difference due to branching is not likely to occur between the reference connection element 42A and the branch connection element 42B, thereby preventing the detection accuracy of the operating position from decreasing.

The increase amount of the resistance values of the wirings 41*a* to 41*c* by the provision of the different shape section 44 may only have to be such an amount that the adjacent sensing wirings 41 of a plurality of sensing wirings 41 have a small time constant difference compared with the configuration that does not include the different shape section 44. That is, the amount of the resistance values increased by the different shape section 44 may only have to be an amount that reduces the time constant difference due to the branch. The path length of the wirings added by the different shape section 44 is determined on the basis of the increase amount of the resistance values of the wirings 41a to 41c, and thus the size of the region for providing the different shape section 44 is determined.

Figure 11:
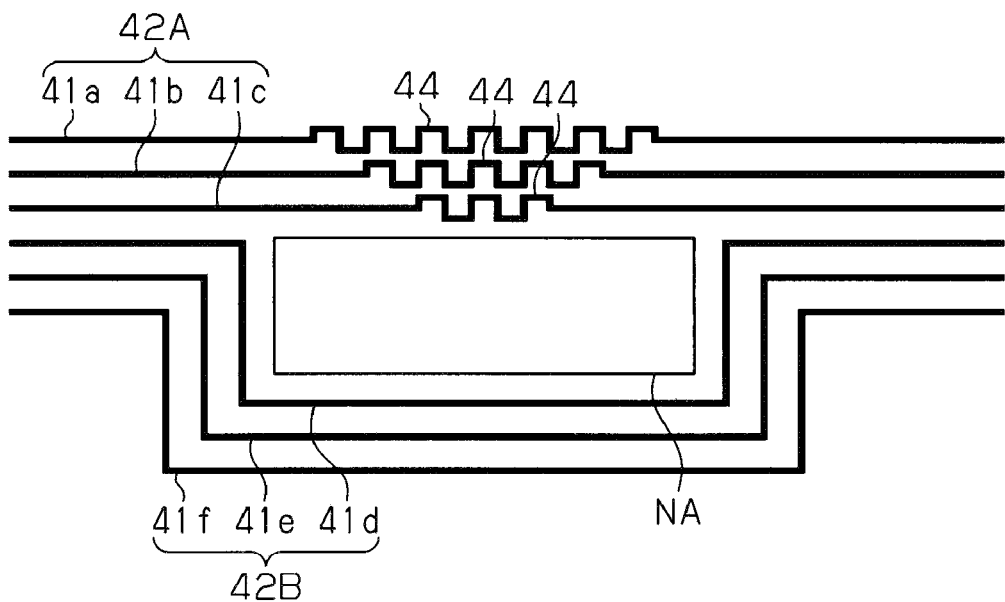
FIG. 11 is an enlarged plan view which shows a vicinity of the non-wiring region in the transparent conductive laminate of a modified example of the third embodiment.

For example, as shown in FIG. 11, the path lengths of the wirings added by the different shape section 44 may be different for each of the wirings 41a to 41c. In the example shown in FIG. 11, the number of bending portions in the different shape section 44 decreases in the order of the wiring 41a, the wiring 41b and the wiring 41c, and thus the path lengths of the wirings added by the different shape sections 44 decrease. Accordingly, the increase amount of the resistance values of the wirings 41a to 41c is different for each of the wirings 41a to 41c.

In this configuration, when the resistance values of the wirings 41a to 41c are different from each other and the different shape section 44 is not provided, the resistance value can be increased depending on the difference in the resistance value.

The shape of the different shape section 44 is not limited to the above shape, and may be any shape, for example, bending in a curve or having a plurality of bending portions in the extending direction of the wiring. In other words, the different shape section 44 may be any shape as far as the path length of the sensing wiring 41 is longer than the straight line between both ends of the region of the different shape section 44. In particular, the sensing wiring 41 can be processed with high accuracy when the different shape section 44 is formed of the sensing wiring 41 that is repeatedly bent at a right angle compared with the different shape section 44 which extends obliquely to the extending direction of the sensing wiring 41 or the different shape section 44 formed in a curve shape.

In the embodiment described above, the non-wiring region NA is disposed in the peripheral region OA on the sensing substrate 22. However, when the non-wiring region NA is disposed in the peripheral region OA on the drive substrate 20, a different shape section may be provided on the drive wiring 31 to increase the path length of the drive wiring 31. Further, when the non-wiring regions NA are disposed on both the peripheral region OA on the sensing substrate 22 and the peripheral region OA on the drive substrate 20, the above configurations can be combined. Moreover, when the path of the branch connection element is configured to branch from the path of the reference connection element, it may be structured not to have the non-wiring region NA.

As described above, according to the third embodiment, the following effect can be obtained in addition to the effect (1) to (3) of the first embodiment.

(6) Since the different shape section 44 is provided so as to adjust the resistance values of the wirings, the time constant difference of the wiring is corrected. That is, the resistance values at the different shape section 44 can reduce the time constant difference due to the branch. Accordingly, the time constant is appropriately corrected. When the time constant is corrected by adding the path length of the wiring, the path lengths of the wiring added by the different shape section 44 may be determined as, for example, the difference in path lengths of the adjacent connection elements. This is less burden for determining the path length of the different shape section 44 compared with determination of the width and the length of the different wiring width section 43 in the second embodiment. Accordingly, the time constant can be easily corrected.

Modified Example

The above embodiments can be modified as follows.

The first to third embodiments can be combined. That is, the transparent conductive laminate 13 may include two or more of the correction electrode 32, the different wiring width section 43 and the different shape section 44 as a correction pattern.

In the above embodiments, at least one of the correction electrode 32, the different wiring width section 43 and the different shape section 44 may be configured to reduce the time constant difference due to the branch only in the wiring pair extending over the reference connection element and the branch connection element. For example, the correction electrode 32 may have a shape that faces only the wiring 41c, or only the wiring 41b and the wiring 41c. Those configurations also can reduce the time constant difference due to the branch in the wiring pair extending over the reference connection element and the branch connection element, thereby reducing the detection accuracy of the operating position associated with the wiring pair.

In the above embodiments, the correction pattern is disposed in the vicinity of the non-wiring region NA. However, the correction pattern may be disposed at any position on the path of the wiring having the time constant to be corrected.

For example, the region on the peripheral region OA can be effectively used by providing the correction pattern in the region on the peripheral region OA having the wirings with low density or in the region having a gap in which no wiring is provided.

Further, the correction pattern that corrects the time constant difference of the drive wiring 31 may be disposed in the region along the side of the peripheral region OA which is the same side on which the drive circuit 50 is provided, and the correction pattern that corrects the time constant difference of the sensing wiring 41 may be disposed in the region along the side of the peripheral region OA which is the same side on which the sensing circuit 51 is provided. In this configuration, the components provided in the peripheral region OA are collected on one side region. Accordingly, unnecessarily expansion of the peripheral region OA can be prevented.

Moreover, providing the correction pattern in the vicinity of the non-wiring region NA allows the input and output signals to and from the circuit to be corrected at a position close to the position that causes a local variation of the time constant difference. Accordingly, the branch of the path of the connection element at the non-wiring region NA does not affect on a large area.

Further, in the configuration in which the correction pattern that reduces a local variation in the time constant difference in a plurality of drive wirings 31 is provided in the vicinity of the detection region SA, the signal immediately after correction is inputted to the drive electrode 30. In the configuration in which the correction pattern that reduces a local variation in the time constant difference in a plurality of sensing wiring 41 is provided in the vicinity of the sensing circuit 51, the signal immediately after correction is inputted to the sensing circuit 51. Accordingly, since the signal immediately after correction is inputted to the input destination of the signal, a detection error due to delay of the signal variation can be reduced.

On the surface having the drive electrodes, the region outside the drive electrodes is defined as a peripheral region. Further, on the surface having the sensing electrodes, the region outside the sensing electrodes is defined as a peripheral region. Each peripheral region faces the region outside the operating position detection region on the operating surface of the touch panel. Usually, the peripheral region includes a region for placing accessories such as various sensors or cameras. The wirings should not be disposed in the region for placing accessories.

Figure 12:
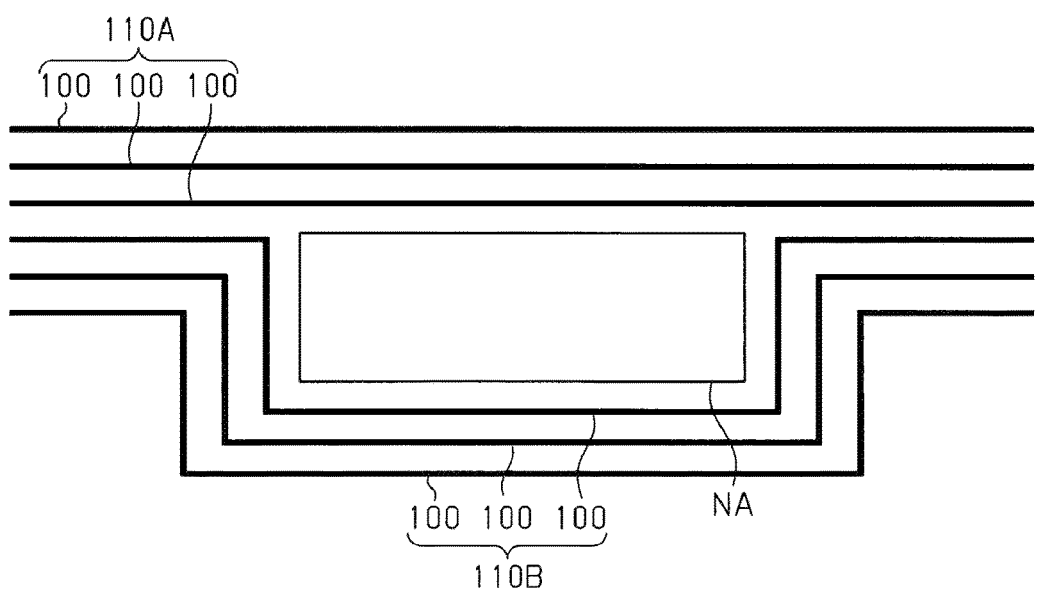
FIG. 12 is an enlarged plan view which shows a vicinity of the non-wiring region in the conventional transparent conductive laminate.

FIG. 12 is a view of an example in which the wirings are positioned at a position other than a non-wiring region which is a region in which the wirings should not be disposed. In the example shown in FIG. 12, a plurality of wirings 100 branch into a connection element 110A, which extends in a straight line without being disturbed by the non-wiring region NA, and a connection element 110B which extends bypassing the non-wiring region NA. Consequently, there is a difference in length between the wirings 100 in the connection element 110A and the wirings 100 in the connection element 110B, which causes difference in electrical properties such as wiring resistance value and wiring capacitance between the wirings 100 in the connection element 110A and the wirings 100 in the connection element 110B. As a result, the time constant difference between the adjacent wirings 100 varies between the connection element 110A and the connection element 110B in the vicinity of the non-wiring region NA. More specifically, the time constant difference between the wiring 100 closest to the connection element 110B among the wirings 100 in the connection element 110A and the wiring 100 closest to the connection element 110A among the wirings 100 in the connection element 110B differs to a large extent from the other time constant differences between the adjacent wirings 100. Such a local variation in time constant difference in a plurality of wirings 100 contributes to decreasing the detection accuracy of the operating position.

In addition, if the non-wiring region NA is not provided, a similar problem occurs when a plurality of wirings 100 branch into different paths of the connection element 110A and the connection element 110B due to the shape of the peripheral region or connection positions of the wirings to the drive circuit or connection positions of the wirings to the sensing circuit or the like.

The technique of the present disclosure has an object to provide a transparent conductive laminate, a touch panel and a display device capable of decreasing detection accuracy of an operating position.

According to an aspect of the invention, a transparent conductive laminate includes a first electrode layer which includes a plurality of first electrodes which extend in a first direction and a plurality of first wirings, each of the plurality of first wirings being connected to a different one of the first electrodes; a second electrode layer which includes a plurality of second electrodes which extend in a second direction and a plurality of second wirings, each of the plurality of second wirings being connected to a different one of the second electrodes; and a transparent dielectric layer located between the first electrode layer and the second electrode layer. Two adjacent first wirings form a wiring pair, and the plurality of first wirings are divided into a plurality of connection elements. Each of the connection elements includes one or more first wirings, the plurality of connection elements include a reference connection element and a branch connection element which are adjacent to each other, and a path of the branch connection element branches from a path of the reference connection element, and at least one of the first electrode layer and the second electrode layer includes a correction pattern, and the correction pattern is configured to reduce a time constant difference which occurs due to the branch between the two first wirings that constitute the wiring pair which extends over the reference connection element and the branch connection element.

According to the above aspect of the invention, a touch panel includes the above transparent conductive laminate.

According to the above aspect of the invention, a display device includes a display panel; and a touch panel laminated on the display panel, wherein the touch panel includes the above transparent conductive laminate.

Obviously, numerous modifications and variations of the present invention are possible in light of the above teachings. It is therefore to be understood that within the scope of the appended claims, the invention may be practiced otherwise than as specifically described herein.

What is claimed is:

1. A transparent conductive laminate, comprising:
   a first electrode layer which includes a plurality of first electrodes extending in a first direction and connected with a plurality of first wirings such that each of the first wirings is connected with a different one of the first electrodes;
   a second electrode layer which includes a plurality of second electrodes extending in a second direction perpendicular to the first direction and connected with a plurality of second wirings such that each of the second wirings is connected with a different one of the second electrodes; and
   a transparent dielectric layer positioned between the first electrode layer and the second electrode layer,
   wherein the first wirings include at least one first wiring that forms a reference connection element and at least one first wiring that forms a branch connection element which is adjacent to the reference connection element and corresponds to a second path branching from a first path corresponding to the reference connection element,
   the first wirings are formed such that the at least one first wiring forming the reference connection element is shorter than the at least one first wiring forming the branch connection element,
   at least one of the first electrode layer and the second electrode layer includes a correction electrode which functions as a correction pattern structure that reduces a time constant difference between the reference connection element and the branch connection element forming a wiring pair with the reference connection element,
   the correction electrode is positioned in at least one of the first electrode layer and the second electrode layer at a location which faces the reference connection element with the transparent dielectric layer interposed therebetween,
   the branch connection element operates independently of correction by any correction electrode,
   the correction electrode has an electric potential different from an electric potential of at least one first or second wiring that faces the correction electrode, and
   wherein the first wirings include at least one first wiring which includes a first portion having a wiring width different from a wiring width of a second portion of the at least one first wiring such that the first portion of the at least one first wiring functions as a correction pattern structure that reduces a time constant difference.

2. The transparent conductive laminate according to claim 1, further comprising:
   a substrate on which the first electrode layer or the second electrode layer is formed.

3. The transparent conductive laminate according to claim 2, wherein the substrate has one side region in a peripheral portion along one side of the substrate having a rectangular shape, the one side region includes a non-wiring region, the first wirings are formed in the one side region such that the reference connection element corresponds to the first path which extends in a straight line adjacent to the non-wiring region, and that the branch connection element corresponds to the second path which extends from the first portion of the path corresponding to the reference connection element and bypasses the non-wiring region, and the correction electrode which functions as the correction pattern structure is positioned in the one side region.

4. The transparent conductive laminate according to claim 3, wherein the first wirings further include at least one first wiring including a portion having a different shape than a second portion, which functions as a correction pattern structure that reduces the time constant difference, and the first portion has a first path length different from a second path length of the second portion per unit length in an extending direction of the first wiring including the first portion.

5. A touch panel, comprising:
the transparent conductive laminate according to claim 3.

6. A display device, comprising:
a display panel; and
a touch panel formed on the display panel and including the transparent conductive laminate according to claim 3.

7. A touch panel, comprising:
the transparent conductive laminate according to claim 4.

8. A display device, comprising:
a display panel; and
a touch panel formed on the display panel and including the transparent conductive laminate according to claim 4.

9. The transparent conductive laminate according to claim 2, wherein the at least one first wiring forming the reference connection element is more than one first wiring, and the correction pattern structure reduces the time constant difference between a first wiring in the branch connection element closest to the reference connection element and each of the first wirings forming the reference connection element.

10. The transparent conductive laminate according to claim 2, wherein the first wirings include at least one first wiring including a first portion having a different shape than a second portion, which functions as a correction pattern structure that reduces the time constant difference, and the first portion a first path length different from a second path length of the second portion per unit length in an extending direction of the first wiring including the first portion.

11. A touch panel, comprising:
the transparent conductive laminate according to claim 2.

12. A display device, comprising:
a display panel; and
a touch panel formed on the display panel and including the transparent conductive laminate according to claim 2.

13. The transparent conductive laminate according to claim 2, wherein a portion of the reference connection element which is faced by the correction electrode is formed in a straight line.

14. The transparent conductive laminate according to claim 1, wherein the at least one first wiring forming the reference connection element is more than one first wiring, and the correction pattern structure reduces the time constant difference between a first wiring in the branch connection element closest to the reference connection element and each of the first wirings forming the reference connection element.

15. The transparent conductive laminate according to claim 1, wherein the first wirings include at least one first wiring which includes a first portion having a different shape than a second portion, which functions as a correction pattern structure that reduces the time constant difference, and the first portion has a first path length different from a second path length of the second portion per unit length in an extending direction of the first wiring including the first.

16. A touch panel, comprising:
the transparent conductive laminate according to claim 1.

17. A display device, comprising:
a display panel; and
a touch panel formed on the display panel and including the transparent conductive laminate according to claim 1.

18. A transparent conductive laminate, comprising:
a first electrode layer which includes a plurality of first electrodes extending in a first direction and connected with a plurality of first wirings such that each of the first wirings is connected with a different one of the first electrodes;

a second electrode layer which includes a plurality of second electrodes extending in a second direction perpendicular to the first direction and connected with a plurality of second wirings such that each of the second wirings is connected with a different one of the second electrodes;

a transparent dielectric layer positioned between the first electrode layer and the second electrode layer, wherein the first wirings include at least one first wiring that forms a reference connection element and at least one first wiring that forms a branch connection element which is adjacent to the reference connection element and corresponds to a second path branching from a first path corresponding to the reference connection element, the first wirings are formed such that the at least one first wiring forming the reference connection element is shorter than the at least one first wiring forming the branch connection element, at least one of the first electrode layer and the second electrode layer includes a correction electrode which functions as a correction pattern structure that reduces a time constant difference between the reference connection element and the branch connection element forming a wiring pair with the reference connection element, the correction electrode is positioned in at least one of the first electrode layer and the second electrode layer at a location which faces the reference connection element with the transparent dielectric layer interposed therebetween, the branch connection element operates independently of correction by any correction electrode, and the correction electrode has an electric potential different from an electric potential of at least one first or second wiring that faces the correction electrode; and a substrate on which the first electrode layer or the second electrode layer is formed, wherein a portion of the reference connection element which is faced by the correction electrode is formed in a straight line.

19. The transparent conductive laminate according to claim 18, wherein the substrate has one side region in a peripheral portion along one side of the substrate having a rectangular shape, the one side region includes a non-wiring region, the first wirings are formed in the one side region such that the reference connection element corresponds to the first path which includes the first and second path and which extends in a straight line adjacent to the non-wiring region, and that the branch connection element corresponds to the second path which extends from the first portion of the path corresponding to the reference connection element and bypasses the non-wiring region, and the correction electrode which functions as the correction pattern structure is positioned in the one side region.

20. The transparent conductive laminate according to claim 18, wherein the at least one first wiring forming the reference connection element is more than one first wiring, and the correction pattern structure reduces a time constant difference between a first wiring in the branch connection element closest to the reference connection element and each of the first wirings forming the reference connection element.

\* \* \* \* \*